US012568543B2

(12) United States Patent
Mehrvar

(10) Patent No.: US 12,568,543 B2
(45) Date of Patent: Mar. 3, 2026

(54) CONNECTION MANAGEMENT METHOD FOR HIGH DEGREE OPTICAL CROSS-CONNECT CLUSTER NODE

(71) Applicant: Huawei Technologies Co., LTD., Shenzhen (CN)

(72) Inventor: Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 18/303,934

(22) Filed: Apr. 20, 2023

(65) Prior Publication Data

US 2023/0319926 A1      Oct. 5, 2023

Related U.S. Application Data

(63) Continuation of application No. PCT/CN2020/127231, filed on Nov. 6, 2020.

(51) Int. Cl.
| | |
|---|---|
| *H04J 14/02* | (2006.01) |
| *H04W 48/16* | (2009.01) |
| *H04W 48/20* | (2009.01) |
| *H04W 76/15* | (2018.01) |

(52) U.S. Cl.
CPC ......... *H04W 76/15* (2018.02); *H04J 14/0212* (2013.01); *H04W 48/16* (2013.01); *H04W 48/20* (2013.01)

(58) Field of Classification Search
CPC ........... H04Q 11/0066; H04Q 11/0067; H04Q 11/0062; H04Q 11/0003; H04Q 11/0005; H04J 14/02; H04J 14/0212; H04J 14/021; H04J 14/0204; H04J 14/0217; H04J 14/0215; H04J 14/0267

USPC ........ 398/45, 46, 47, 48, 49, 50, 51, 52, 53, 398/54, 55, 56, 57, 59, 79, 82, 83, 33, 38, 398/158, 159; 385/24, 16, 17, 18
See application file for complete search history.

(56) References Cited

U.S. PATENT DOCUMENTS

| | | | | |
|---|---|---|---|---|
| 7,317,873 B2 * | 1/2008 | Aoki | .................. | H04Q 11/0005 |
| | | | | 398/55 |
| 2006/0165081 A1 * | 7/2006 | Benner | .................. | H04L 45/00 |
| | | | | 370/392 |
| 2015/0104171 A1 * | 4/2015 | Hu | ..................... | H04Q 11/0066 |
| | | | | 398/48 |

FOREIGN PATENT DOCUMENTS

| | | |
|---|---|---|
| CN | 1486012 A | 3/2004 |
| CN | 101720050 A | 6/2010 |
| CN | 104024917 A | 9/2014 |

(Continued)

*Primary Examiner* — Hanh Phan

(57) ABSTRACT

Method and communication network for establishing a connection in a communications network are disclosed. The method comprises receiving, by a processor, a connection request for establishing the connection; selecting, by the processor, an input node from a plurality of input nodes in the communications network and an output node from a plurality of output nodes in the communications network; selecting, by the processor, an interconnect node from a plurality of interconnect nodes in the communications network in accordance with an order set out in a pre-determined order list that sets out a specific connection order for each of the plurality of interconnect nodes; determining whether the interconnect node has capacity to connect the input node to the output node; and in response to the interconnect node having the capacity, connecting, by the processor, the input node to the output node via the interconnect node.

18 Claims, 13 Drawing Sheets

(56)  References Cited

FOREIGN PATENT DOCUMENTS

| | | | |
|---|---|---|---|
| CN | 104753624 | A | 7/2015 |
| EP | 3588818 | A1 | 1/2020 |
| EP | 3588819 | A1 | 1/2020 |
| WO | 2016045716 | A1 | 3/2016 |

* cited by examiner

150

700

770

Processor
710

Mass
Storage
730

Network
Interface
750

Memory
720

I/O interface
740

Tx/Rx
760

CONNECTION MANAGEMENT METHOD FOR HIGH DEGREE OPTICAL CROSS-CONNECT CLUSTER NODE

CROSS-REFERENCE TO RELATED APPLICATIONS

This application is a continuation of international patent application No. PCT/CN2020/127231 filed Nov. 6, 2020, the contents of which are incorporated herein by reference.

TECHNICAL FIELD

The present invention relates to communications networks, and in particular, to connection management methods and systems for high degree optical cross-connect cluster nodes.

BACKGROUND

Existing fiber optic networks may use optical nodes including reconfigurable optical add-drop multiplexers (ROADMs) to perform add, block, pass or redirect of light beams of various wavelengths. Existing ROADMs offer limited degrees or directions and limited add/drop rate.

However, as the demand for optical network capacity increases, existing ROADMs may be unable to meet the demand. In addition, equipment vendors and carriers desire to reuse existing ROADMs for future scaling.

Therefore, it is desirable that the architecture of fiber optic networks/ROADMs is scalable and at a low cost, and that fiber optic networks/ROADMs also have an acceptable blocking rate, such as lower than $10^{-3}$, for connectivity of a wavelength from a direction to another direction.

SUMMARY

The present disclosure provides a connection management method and communications network for a multi-stage communications network, including a high degree optical cross-connect cluster node or a ROADM cluster node architecture. The connection management method and communications network provides a low-cost, scalable and feasible solution for next generation of ROADM nodes. The connection management method and system significantly improve blocking rate to about 10-5 without rearranging the existing algorithm or architecture.

In accordance with embodiments of the present invention, there is provided a method for establishing a connection in a communications network, which comprises receiving, by a processor, a connection request for establishing the connection; selecting, by the processor, an input node from a plurality of input nodes in the communications network and an output node from a plurality of output nodes in the communications network; selecting, by the processor, an interconnect node from a plurality of interconnect nodes in the communications network in accordance with an order set out in a pre-determined order list that sets out a specific connection order for each of the plurality of interconnect nodes; determining whether the interconnect node has capacity to connect the input node to the output node; and in response to the interconnect node having the capacity, connecting, by the processor, the input node to the output node via the interconnect node.

In accordance with embodiments of the present invention, there is provided a communications network, which comprises: a plurality of input nodes; a plurality of output nodes;

a plurality of interconnect nodes; and a controller configured to: receive, by a processor, a connection request for establishing the connection; select, by the processor, an input node from the plurality of input nodes in the communications network and an output node from the plurality of output nodes in the communications network; select, by the processor, an interconnect node from the plurality of interconnect nodes in the communications network in accordance with an order set out in a pre-determined order list that sets out a specific order for each of the plurality of interconnect nodes; determine whether the interconnect node has capacity to connect the input node to the output node; and in response to the interconnect node having the capacity, connect, by the processor, the input node to the output node via the interconnect node.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

A ROADM is an optical node that adds, blocks, passes or redirects light beams of various wavelengths identified by their colors in a fiber optic network. ROADMs are used in systems that employ wavelength division multiplexing allowing data traffic modulated on a wavelength to be added at a source node and then passed through one or many ROADM nodes before the data traffic is dropped at a destination node. Once dropped, the destination node demodulates the light to electrical signals and decodes the data into bits.

A ROADM plays a key role in switching and transporting of high volumes of data. The ROADM is characterized by two parameters: one is the number of directions (or the number of fibers) and the other is the number of wavelengths that can be added or dropped at the ROADM. Each fiber can carry a predetermined number of wavelengths, for example 80 wavelengths for International Telecommunication Union (ITU) 50 GHz fixed grid. In the absence of wavelength conversion at the ROADM node, a wavelength of a fiber in a first direction is dropped or switched to the same wavelength of a second direction.

The highest degree or number of directions that a ROADM may offer on the market today is 8 or 16. If the number of wavelengths in each direction is 80, the number of wavelengths that can be added or dropped is limited. For instance, the add-drop rate for a ROADM node such as an OSN 9800 is 45% when deployed as an 8 degree ROADM, and 15% when deployed as a 16 degree ROADM. Accordingly, the number of add-drop wavelengths, where each fiber carries 80 wavelengths, for an 8 degree ROADM is about 0.45×8×80=288 wavelengths; and for a 16 degree ROADM, the number of add-drop wavelengths is 0.15×16×80=192 wavelengths.

Figure 1A:
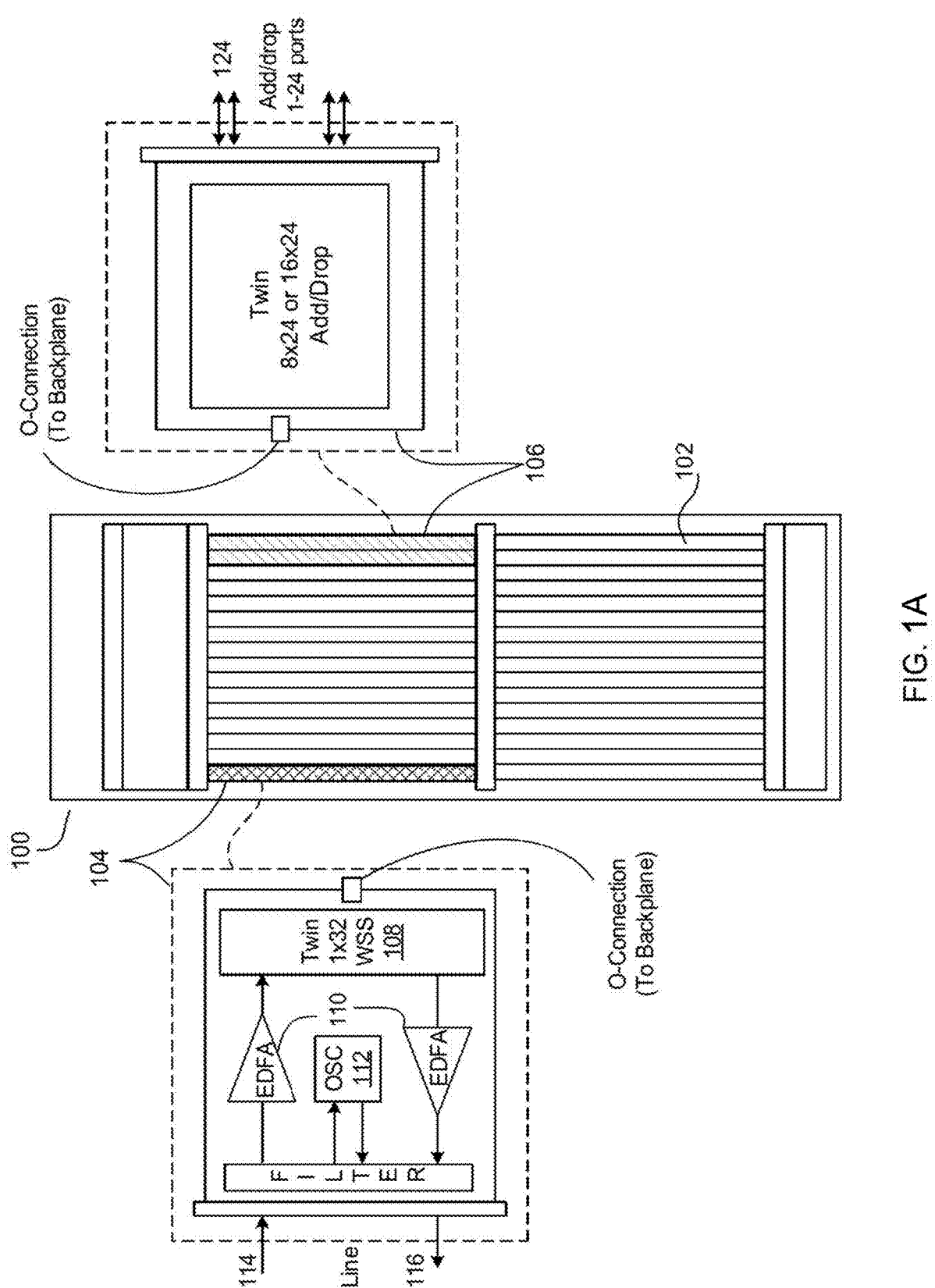
FIG. 1A is an example of an existing chassis for a ROADM node, according to an embodiment of the present invention.

FIG. 1A is an example of an existing chassis for a ROADM node. Referring to FIG. 1A, the chassis 100 may comprise 32 slots 102 for receiving one or more line cards 104 and one or more add-drop tributary cards 106. Each slot 102 may be fully interconnected to the other 31 slots, for example through a common optical backplane (not shown). Each of the line card 104 and the add-drop tributary card 106 may connect to the common backplane via an Optical Connection (O-connection).

The line cards 104 may perform line functionality as it may be interconnected to other ROADM nodes. The add-drop tributary cards 106 may drop one or more wavelengths to a node and add one or more wavelengths to a line card 104.

The total degree of a ROADM node is the total number of fiber pairs connected to the ROADM node. Each fiber pair connects with a line card 104, one fiber on the receiving side 114 and the other fiber on the transmitting side 116.

Each line card 104 occupies a single slot 102 of the chassis 100. Each line card 104 may comprise one fiber pair indicating one direction, both ways. The line card 104 may comprise two 1×32 wavelength select switch (WSS) 108, one on the receiving side 114 and another on the transmitting side 116. The line card 104 may further comprise two EDFA amplifiers 110 and a circuitry for Optical Service Channel (OSC) 112. On the receiving side, the WSS 108 can extract all 80 or 96 wavelengths in a fiber and place each wavelength at any of its 32 outputs. As each line card is interconnected with all other line cards via the backplane, any wavelength received at each line card 104 may be transmitted to any other line cards (directions). Since each slot 102 may be fully interconnected to the other 31 slots, the interconnection between the slots 102 allows for full mesh interconnectivity between the line cards 104.

The add-drop tributary card 106 may occupy 2 slots 102. The add-drop tributary card 106 may comprise 24 add-drop ports 124 allowing for up to 24 wavelengths to be added to or dropped at the ROADM.

Figure 1B:
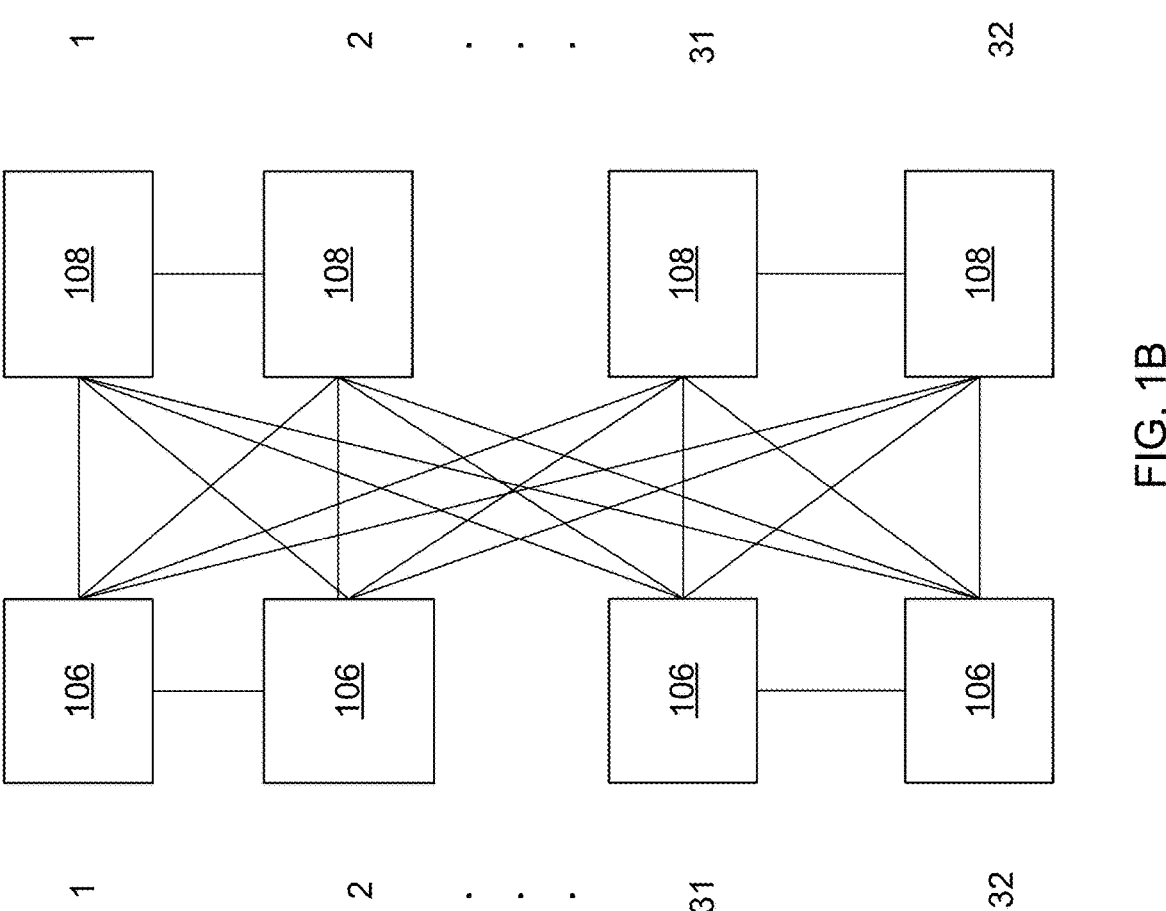
FIG. 1B is an example of an optical backplane interconnecting the slots of the chassis of FIG. 1A, according to an embodiment of the present invention.

An incoming wavelength may be dropped through an add/drop tributary card 106 of a ROADM. FIG. 1B is an example of an optical backplane 150 interconnecting the slots of chassis of FIG. 1A, according to an embodiment of the present invention. In FIG. 1B, each of the 32 slots 102 may be interconnected to the other 31 slots, through the optical connection established by the optical backplane 150. Accordingly, each line card 104 placed in slots 102 may be interconnected with each of the other line cards 104 and each add/drop tributary cards 106 placed in slots 102. Similarly, each add/drop card tributary 106 places in slots 102 may be interconnected with each of the other add/drop cards tributary 106 and each line cards placed in slots 102. As such, the wavelength arriving at a line card 104 of the ROADM is transferred, through the backplane 150, to the appropriate add/drop tributary card 106 for dropping. The wavelength is then dropped through one of the add/drop ports 124, which may connected to a router.

A wavelength connection may also be added to any direction by an add-drop tributary card 106 for transmission in an optical transmission system. For example, a router connected to an add/drop port 124 may send data to the add/drop tributary card 106. The data may be added as a wavelength for transmission in a line card 104. The add/drop tributary card 106 modulates electrical signals from the router to light signals to an assigned wavelength for transmission. The add-drop tributary card 106 is optically connected to all line cards 104 via the common optical backplane. The light signals may be transmitted by a selected line card 104 at the assigned wavelength to an appropriate direction.

In some embodiments, the chassis 100 may be used to design an 8 degree ROADM node. For an 8 degree ROADM node, the chassis 100 may comprise 8 line cards 104 occupying 8 slots 102. The remaining 24 slots (32 total slots minus 8 slots used for 8 line cards 104) may be used for 12 add-drop tributary cards 106, each occupying two slots 102. Accordingly, the number of add-drop wavelengths for an 8 degree ROADM node may be 288 (12 add-drop tributary cards×24 wavelength/add-drop tributary card). Therefore, for the case of 96 wavelengths in each direction, the 8 degree ROADM node may have an add-drop rate of 37.5%=(288 wavelengths/(8 line cards×96 wavelengths/line card)). And for the case of 80 wavelengths in each direction, the 8 degree ROADM node may have an add-drop rate of 45%=(288 wavelengths/(8 line cards×80 wavelengths/line card)).

In other embodiments, the chassis 100 may be used to design a 16 degree ROADM node. For a 16 degree ROADM node, the chassis 100 may comprise 16 line cards 104 occupying 16 slots 102. The remaining 16 slots (32 total slots minus 16 slots used for 16 line cards 104) may be used for 8 add-drop tributary cards 106, each occupying two slots 102. Accordingly, the number of add-drop wavelengths for the 16 degree ROADM node may be 192 (8 add-drop tributary cards×24 wavelength/add-drop tributary card). Therefore, for the case of 96 wavelengths in each direction, the 16 degree ROADM node may have an add-drop rate of 12.5%=(192 wavelengths/(16 line cards×96 wavelengths/line card)). And for the case of 80 wavelengths in each direction, the 16 degree ROADM node may have an add-drop rate of 15%=(192 wavelengths/(16 line cards×80 wavelengths/line card)).

However, in FIG. 1A, the line and add-drop functions are concurrently performed by the same chassis 100. When the capacity of the transmission networks is expanded, new chassis is required to replace the existing chassis. As such, it is expensive and inflexible to expand the capacity of the transmission network with the existing chassis.

Figure 2:
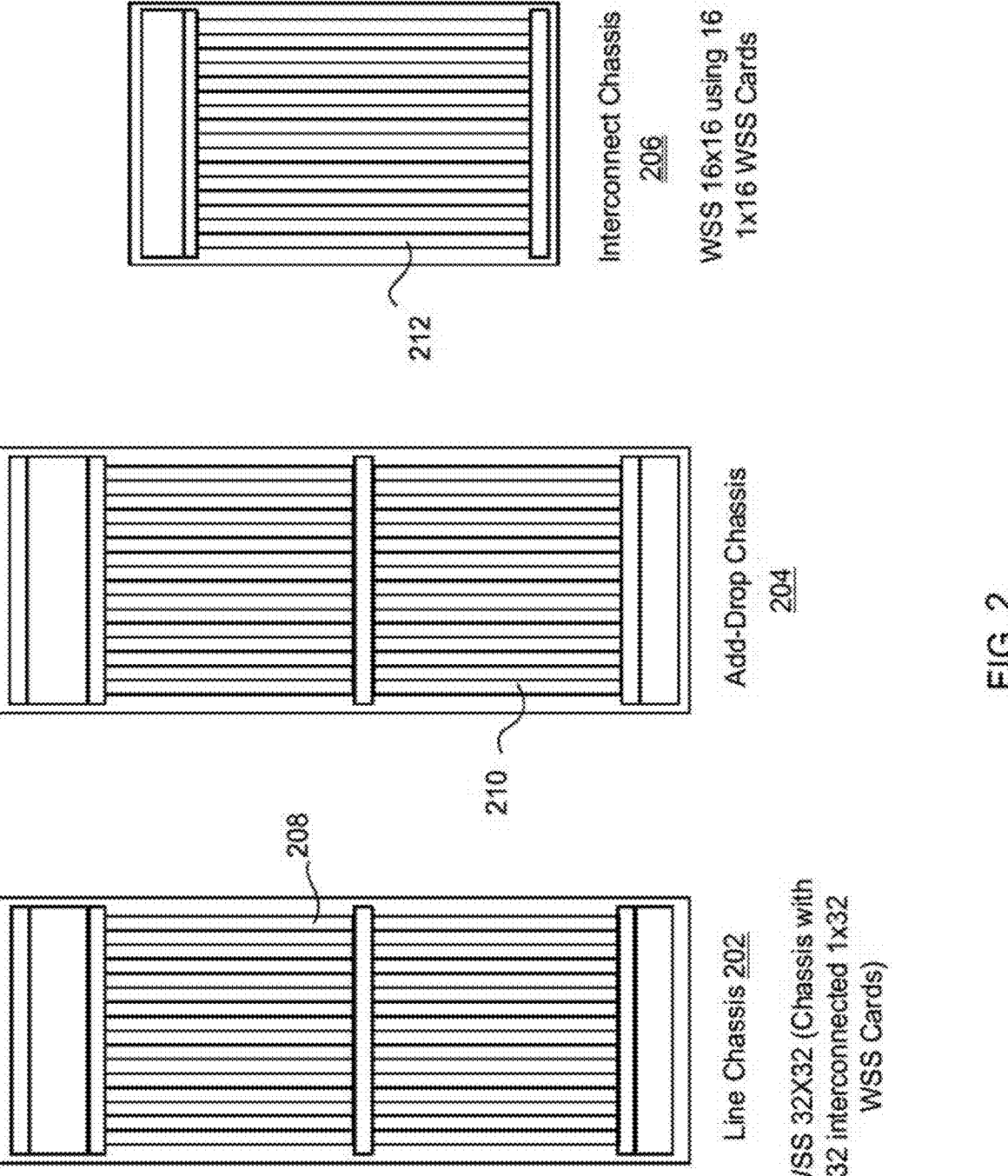
FIG. 2 illustrates a line chassis, an add-drop chassis, and an interconnect chassis of a ROADM cluster node, according to an embodiment of the present disclosure.

FIG. 2 illustrates components of a ROADM cluster node that allows for a low-cost, scalable and feasible solution for next generation of ROADM nodes. The ROADM cluster node may be constructed using existing chassis, such as chassis 100. Using existing chassis allows for re-usability and flexibility and offers carriers the option to pay for additional capacity as needed.

As discussed in FIG. 1A, all functions of the ROADM cluster node are performed in the same chassis 100. In FIG. 2, the ROADM cluster node functions are performed in separate chassis, and each chassis performs different functions. In the example of FIG. 2, the ROADM cluster node comprises a first set of line chassis 202, a second set of add-drop chassis 204, and a third set of interconnect chassis 206. Each of the first set of line chassis 202, second set of add-drop chassis 204, and third set of interconnect chassis 206 may comprise the same chassis 100 as described above.

The first set of line chassis 202 comprises at least one line chassis for performing exclusively line functionality without add-drop functionality. The second set of add-drop chassis 204 comprises at least one add-drop chassis for performing exclusively add-drop functionality without line functionality. The third set of interconnect chassis 206 comprises at least one interconnect chassis for interconnecting the first set of line chassis 202 and the second set of add-drop chassis 204.

The line chassis 202 may comprise 32 slots 208 for housing 32 WSS line cards. Each line card may be similar to line card 104. Each interconnect card may be a twin 1×32 WSS card. In some examples, N line cards may be used as line cards to connect with external nodes, such as other ROADMS. M=32−N of the line cards may connect internally with other nodes within the ROADM cluster node, such as other line cards of interconnect chassis 206.

The add-drop chassis 204 may comprise 32 slots 210 for housing both add-drop cards and WSS cards. For example, the add-drop chassis 204 may comprise 32 slots 210 for housing N/2 to N add-drop cards and M=32-N WSS cards. Each add-drop card may be similar to add-drop tributary card 106 and each interconnect card may be a twin 1×32 WSS card. The WSS cards are used to connect internally to other nodes of the ROADM cluster node. The add-drop tributary cards are the transponder cards tuned to the wavelengths needed to be added to or dropped at the ROADM cluster node. The WSS cards may be used to interconnect the add-drop chassis 204 to each interconnect chassis 206.

The interconnect chassis 206 may comprise 16 slots 212 for housing 16 WSS cards. The interconnect chassis 206 may be a low-cost common equipment chassis for ROADM cluster node. For example, the interconnect chassis 206 may comprise 16 twin 1×16 WSS cards, and be referred to as 16×16 WSS. As such, selection of interconnect chassis 206 provides low cost solution for both equipment supplier and the carrier. In interconnect chassis 206, the WSS cards provide the interconnectivity between the at least one line chassis 202 and the at least one add-drop chassis 204 of a ROADM cluster node.

Therefore, each of the chassis 202, 204 and 206 performs different network functions in a ROADM cluster node. Each of the chassis 202, 204 and 206 may also be referred to as a line node, an add-drop node, and a interconnect node in a ROADM cluster node, respectively. In the description below, the terms "node" and "chassis" are used interchangeably.

As well, performing separate node functions at separate chassis increases the number of degree of a ROADM to 100 or more degrees, provides for a flexible add-drop rate ranging from 0% to 100%. As well, using existing chassis provides for future scaling while minimizing any loss of investments in the existing chassis.

Figure 3:
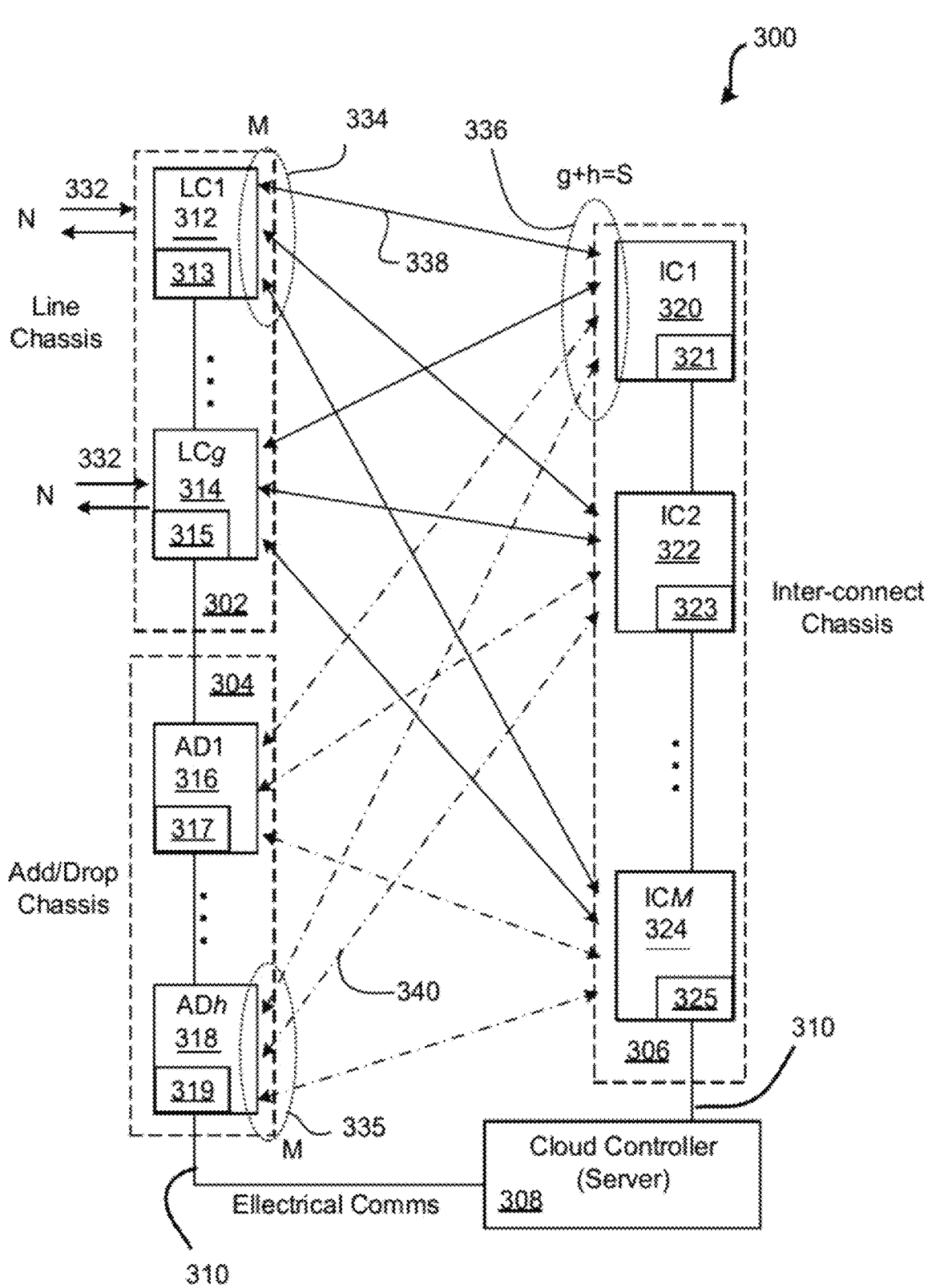
FIG. 3 illustrates a ROADM cluster node, according to an embodiment of the present invention.

FIG. 3 illustrates an example of a ROADM cluster node 300 comprising M interconnect chassis 306, interconnecting g line chassis 302, h add-drop chassis 304, and a cloud controller 308.

In FIG. 3, M interconnect chassis 306 include interconnect chassis IC1 320, IC2 322 . . . and ICM 324. Each of the M interconnect chassis 306 may be an interconnect chassis 206 as described in FIG. 2.

g line chassis 302 include LC1 312 to LCg 314. Each of the g line chassis 302 may be a line chassis 202 as described in FIG. 2. h add-drop chassis 304 include AD1 316 to ADh 318. Each of the h add-drop chassis 304 may be an add-drop chassis 204 as described in FIG. 2.

Each of g line chassis 302 may comprise N line cards 332 for N incoming and outgoing fibers and M interconnect cards 334. Each of the h add-drop chassis 304 may comprise M interconnect cards 335 and N/2 to N add-drop cards. Each of the M interconnect chassis 306 may comprise S interconnect cards 336 for interconnecting each of the g line chassis 302 and each of the h add-drop chassis 304, where S=g+h.

Each of the M interconnect cards 334 of each of the g line chassis 302 may connect via fiber 338, shown as solid line, to each of the M interconnect chassis 306. Similarly, each of the M interconnect cards 335 of each of the h add-drop chassis 304 may connect via fiber 340, shown as dot-dash line, to each of the M interconnect chassis 306.

The ROADM cluster node 300 provides for two levels of interconnectivity. The first level of interconnectivity is at intra-chassis or intra-connectivity level, for example, via a common backplane, within line chassis 302, add-drop chassis 304 or interconnect chassis 306. The second level of interconnectivity is at the inter-chassis or interconnectivity level, between different chassis. For example, each of M interconnect chassis 306 interconnects each of the g line chassis 302 with the each of the h add-drop chassis 304.

In the example of FIG. 3, the cloud controller 308, which may also be referred to as a cluster controller or a server, is configured to control the operation of the ROADM cluster node 300.

The cloud controller 308 may maintain status of all connections of the ROADM node cluster 300. The cloud controller 308 may also communicate management messages to all line chassis 302 and add-drop chassis 304 in setting-up a new connection from one chassis to another chassis. In some examples, the cloud controller 308 may communicate management messages including commands or instructions to relevant line, add/drop, and interconnect chassis for setting up a new connection, for example, via an interconnect chassis 306, from a line card of line chassis 312 to a line card of another chassis 314, from a line card of line chassis 302 to a drop card of add-drop chassis 304, or from an add card of add-drop chassis 304 to a line card of line chassis 302. The cloud controller 308 may also communicate management messages for releasing an existing connection between any two chassis of the ROADM cluster node 300, for example, between a line card of line chassis 312 to a line card of another chassis 314, between a line card of line chassis 302 to a drop card of add-drop chassis 304, or between an add card of add-drop chassis 304 to a line card of line chassis 302.

In the example of FIG. 3, each of the g line chassis 302 may have a corresponding chassis controller, such as line chassis controllers 313 and 315. Each of the h add-drop chassis 304 may have a corresponding chassis controller, such as add-drop chassis controllers 317 and 319. Each of the M interconnect chassis 306 may have a corresponding chassis controller such as interconnect chassis controllers 321, 323 and 325. The cluster controller 308 may be connected with, via communication channel 310, and send instructions to, each of the g line chassis controllers, each of the h add-drop chassis controllers, and each of the M interconnect chassis controllers. The chassis controllers may receive instructions from the cluster controller 308 and operate the respective chassis according to the received instructions. In some examples, the communication channel 310 may be provided by communication cables, such as by electrical cables or fiber.

In the example of FIG. 3, in the ROADM cluster node 300, M refers to the number of interconnect chassis 306 which may be low-cost common equipment. N refers to the number of fibers or degrees for each of the g line chassis 302. M+N equals to the total number of WSS cards that a line chassis 302 may support, for example, M+N=32.

As well, S=g+h, which is the total number of interconnect cards that each of the M interconnect chassis 306 may support, for example, S=16. The total degree of the ROADM cluster node 300 is g*N. The add-drop rate of the ROADM cluster node 300 may be determined by the parameter h.

Selection of appropriate values for M and N has both cost and performance impact. In a 3-stage non-blocking CLOS architecture, the relationship between M and N is M>2N−1. A CLOS network is a multistage circuit-switching network including the ingress stage, the middle stage, and the egress stage.

In the present disclosure, the relationship between M and N is N<M<=1.3*N. This relationship indicates that the bandwidth for connectivity of a line or add/drop chassis to the interconnect chassis (and vice versa) is no more than 1.3 times of nodal bandwidth (i.e. no more than 30% dilation). Examples of selecting appropriate M and N are described in a related US patent application entitled "HighDegree Optical Cross-connect Cloud Cluster Node Architecture", Application No. PCT/CN2020/116931, filed Sep. 22, 2020, the content of which is incorporated herein in its entirety.

Table 1 below shows different combinations of g and h in a 3-stage CLOS condition with M>=2N−1, M+N=32, and g+h=16:

TABLE 1

| CONFIG CASES N = 11, M = 21 | Case 1: g = 8; h = 8 | Case 2: g = 10; h = 6 | Case 3: g = 12; h = 4 | Case 4: g = 14; h = 2 | Case 5: g = 16; h = 0 |
|---|---|---|---|---|---|
| Degree | 88 | 110 | 132 | 154 | 176 |
| Add-drop rate | 100% | 60% | 33% | 14% | 0% |

In Table 1 above, M=21, 21 common equipment chassis are used, and the CLOS architecture cluster node provides 88-176 directions for the cluster node.

In comparison, Table 2 below shows different combinations of g and h in a ROADM cluster node 300 with N<M<=1.3*N, M+N=32, and g+h=16:

| CONFIG CASES N = 14, M = 18 | Case 1: g = 8; h = 8 | Case 2: g = 10; h = 6 | Case 3: g = 12; h = 4 | Case 4: g = 14; h = 2 | Case 5: g = 16; h = 0 |
|---|---|---|---|---|---|
| Degree | 112 | 140 | 168 | 196 | 224 |
| Add drop rate | 100% | 60% | 33% | 14% | 0% |

In Table 2 above, M=18, 18 common equipment chassis are used, the ROADM cluster node 300 provides 112-224 directions for the cluster node.

As also shown in Table 2, the ROADM cluster node 300 may have up to 224 degrees with varying add/drop rate, for example, by using WSS 32×32 and WSS 16×16. As well, the ROADM cluster node 300 may be scaled up or down. For example, a version of the ROADM cluster node 300 may be scaled down to 56 to 112 degrees by use of only WSS 16×16 for both line and add/drop chassis 304.

Compared with classical 3-stage CLOS condition with M>=2N−1 in Table 1, the ROADM cluster node 300 with N<M<=1.3*N in Table 2 has lower interconnect chassis M and thus has lower common equipment cost, while the size or degrees of the node is higher. As such, the ROADM cluster node 300 provides significant scaling and cost benefits.

Figure 4:
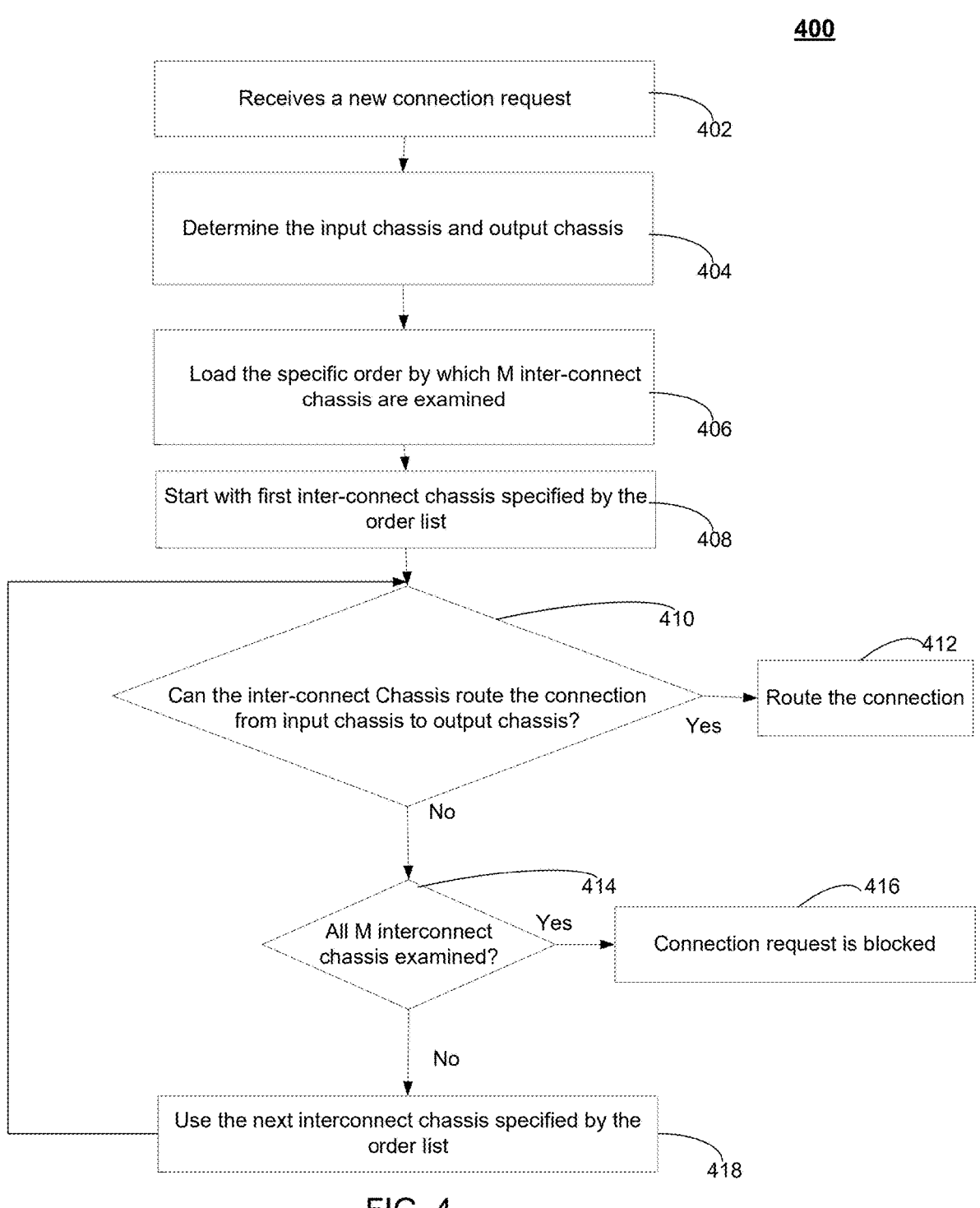
FIG. 4 is a flow chart illustrating a connection management process of the ROADM cluster node in FIG. 3.

This architectural relationship of N<M<=1.3*N in Table 2 and the connection management process to be described in FIG. 4 collectively improves the blocking rate of the ROADM cluster node 300 to about 10-5 or 0.00001.

FIG. 4 is a flow chart illustrating an example connection management process 400 for a ROADM cluster node 300. In process 400, the cloud controller 308 is configured to establish a wavelength connection from an input node of ROADM cluster node 300 to an output node of ROADM cluster node 300 through a center-stage node with an order specified in the controller 308.

As illustrated in FIG. 4, at step 402, at the ROADM cluster node 300, the cloud controller 308 receives a new connection request, for example, from a network administrator. The connection request may be to route a wavelength from a direction to another direction. The connection request includes establishing a connection from a line card of line chassis 302 to a line card of another line chassis 302, from a line card of a line chassis 302 to a drop card of an add-drop chassis 304, or from an add card of an add-drop chassis 304 to a line card of a line chassis 302.

At step 404, the cloud controller 308 determines within the ROADM cluster node 300 an input chassis and an output chassis that satisfy the connection request. The input chassis and the output chassis may be a line chassis 302 or an add-drop chassis 304.

For example, a ROADM cluster node 300 is in Toronto. The connection request is for a wavelength connection from Montreal to Vancouver. In this case, at the ROADM cluster node 300 at Toronto, the cloud controller 308 identifies the line card of line chassis 302 that receives the wavelength from Montreal, and another line card of line chassis 302 that can transmit the wavelength to Vancouver. In another example, the connection request is to add a new wavelength from Toronto for transmitting to Vancouver. In this case, the cloud controller 308 identifies, in ROADM cluster node 300 in Toronto, an add card of an add/drop chassis 304 for adding the wavelength, and a line card of line chassis 302 that can transmit the wavelength to Vancouver. In another example, the connection request is to drop a wavelength from Montreal at ROADM cluster node 300 in Toronto. In this case, the cloud controller 308 identifies the line card of line chassis 302 that receives the wavelength from Montreal, and a drop card of an add/drop chassis 304 at ROADM cluster node 300 in Toronto for dropping the wavelength in Toronto.

After the cloud controller 308 has determined input chassis and the output chassis, the cloud controller 308 loads a specific order by which the M interconnect chassis are examined (step 406). A network administrator may set the specific order. The specific order sets the sequence or priority for each M interconnect chassis to be examined for selecting an appropriate interconnect chassis to establish the new connection. For example, the order may be O1={1, 3, 5, . . . , M, 2, 4, 6 . . . . M–1}. In O1, the interconnect chassis No. 1 has the highest priority and is first examined, and the interconnect chassis No. M–1 is has the lowest priority and is last examined. The order list may be any permutation of 1 to M, for example, 1, 2, 3 . . . . M.

Based on the order, the cloud controller 308 starts examining the first interconnect chassis 306 specified by the order (at step 408). In the example of O1, the cloud controller 308 starts examining interconnect chassis No. 1, and determines whether the interconnect chassis 306 under examination has the capacity to route the connection or wavelength from the input chassis to the output chassis (step 410). In some examples, as the cloud controller 308 maintains the status of all connections in the ROADM node cluster 300, the cloud controller 308 has the information of all connections routed by the first interconnect chassis. In some examples, the cloud controller 308 may inquire the controller of the first interconnect chassis 306 to determine whether first interconnect chassis 306 still has available capacity to route the connection or wavelength from the input chassis to the output chassis. The available capacity may be determined based on whether the specific wavelength of the requested connection can be provided by the interconnect chassis 306, or whether the bandwidth of the requested connection can be provided by the interconnect chassis 306.

If the cloud controller 308 determines that the first interconnect chassis 306 still has capacity to route the connection from the input chassis to the output chassis, the cloud controller 308 selects the first interconnect chassis to route the connection from the input chassis to the output chassis via the first interconnect chassis 306 (Step 412). In some examples, the cloud controller 308 may send management messages or instructions to the controllers of respective input chassis, output chassis and the interconnect chassis to establish a connection from the input chassis to the output chassis via the first interconnect chassis 306.

However, if the cloud controller 308 determines that the first interconnect chassis 306 does not have capacity to route the connection from the input chassis to the output chassis, at step 414, the cloud controller 308 determines whether all M interconnect chassis are examined. If the cloud controller 308 has examined all of the M interconnect chassis but none of them has available capacity to connect the input chassis to the output chassis, the cloud controller 308 blocks the connection request (step 416).

If the cloud controller 308 has not examined all of the M interconnect chassis 306, the cloud controller 308 examines the next interconnect chassis specified on the order list (step 418). The cloud controller 308 uses the next interconnect chassis specified in order list. In the example of O1, if the cloud controller 308 determines that the interconnect chassis No. 1 does not have available capacity to route the connection from the input chassis to the output chassis, the cloud controller 308 uses the next interconnect chassis specified in order, namely, the interconnection chassis 3 in the second order of O1. The cloud controller 308 repeats steps 410-418 to establish the requested connection until the connection is routed at step 412 or the connection request is blocked at step 416.

In the process 400, the wavelength of a connection remains the same. As a result, a wavelength from the input chassis connects to the same wavelength of the output chassis through an interconnect chassis. In the process 400, a connection may be a single wavelength or a single channel. A connection may also be a multi-wavelength channel or a super-channel. A super-channel comprises multiple, coherent optical carriers combined to create a unified channel with a higher bandwidth in order to support a higher data rate. A super-channel may include 4 single wavelengths or 4 single channels with continuous spectrum in a fiber. In process 400, the super-channel is connected in the same manner as a single channel or wavelength.

The specific pre-determined order in process 400 allows the cloud controller 308 to route the connection through the most utilized interconnect chassis or node 306. In the example of O1={1, 3, 5, . . . , M, 2, 4, 6, . . . , M–1}, the cloud controller 308 first uses the interconnect chassis 306 in the first order, such as No. 1, for a new connection request, until the capacity of the interconnect chassis 306 in the available capacity of the first order is fully used. The cloud controller 308 then uses the interconnect chassis 306 in the second order, such as 3, for a new connection request until the capacity of the interconnect chassis 306 in the second order is fully used, and so on until the capacity of the interconnect chassis 306 of last order, such as M–1, is fully used. Therefore, if the order for interconnect chassis 306 is O1={1, 3, 5, . . . , M, 2, 4, 6, . . . , M–1} then the most utilized interconnect chassis 306 is U1={1, 3, 5, . . . , M, 2, 4, 6, . . . , M–1}, the same as the order O1. The interconnect chassis 1 is the most used interconnect chassis and the interconnect chassis M–1 is the least used interconnect chassis.

Figure 5:
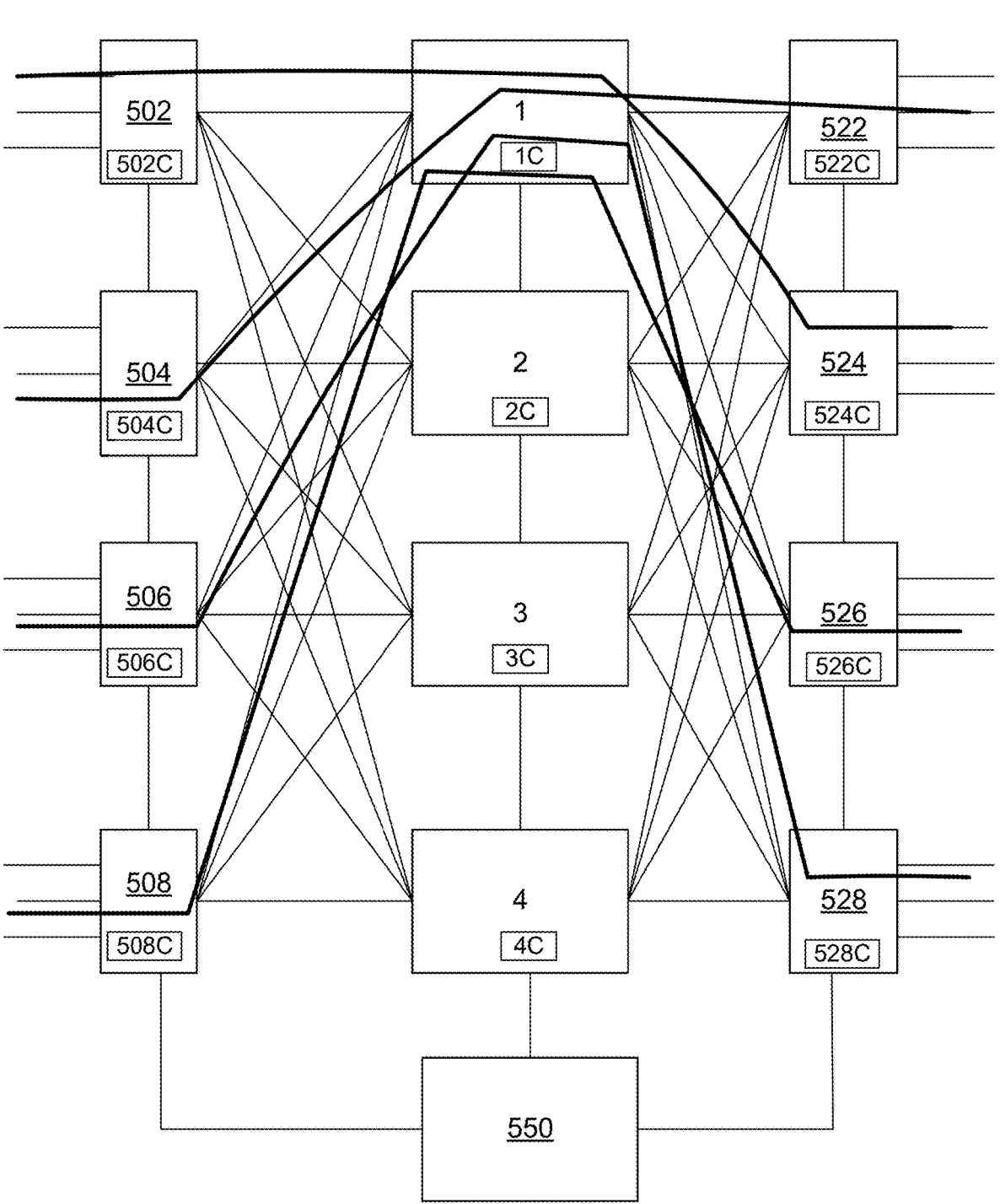
FIG. 5 illustrates an example of an interconnect chassis selection process according to a pre-determined specific order in FIG. 4.

The interconnect chassis selection in process 400 is further described in the context of FIG. 5. FIG. 5 illustrates examples of establishing connections in a ROADM cluster node 500 based on a predetermined specific order using the process 400.

As illustrated in FIG. 5, the ROADM cluster node 500 comprises a plurality of input chassis 502, 504, 506 and 508, a plurality of interconnect chassis 1, 2, 3, and 4, a plurality of output chassis 522, 524, 526, and 528, and a controller 550, such as a cloud controller. The input chassis 502, 504, 506 and 508 may be line chassis 302 and add chassis 304 in FIG. 3, the output chassis 522, 524, 526, and 528 may be the line chassis 302 and drop chassis 304 in FIG. 3, and the controller 550 may be the cloud controller 308 in FIG. 3.

As illustrated in the example of FIG. 5, the predetermined order saved in the controller 550 is the interconnect chassis selection order O={1, 3, 2, 4}. After the controller 550 receives a connection request, for example, from a network administrator, according to the interconnect chassis order O, the controller 550 first examines interconnect chassis 1 for a new connection. If the interconnect chassis 1 does not have capacity to route the new connection, the controller 550 then examines the interconnect chassis 3 for routing the new connection. If the interconnect chassis 3 also does not have the capacity to route the new connection, the controller 550 examines the interconnect chassis 2. If the interconnect chassis 2 also does not have the capacity to route the new connection, the controller 550 examines the interconnect chassis 4. If all of the interconnect chassis 1, 3, 2, and 4 do not have available capacity to route the new connection, the connection request is blocked. As such, in ROADM cluster node 500, the rank of the utility of interconnect chassis is 1, 3, 2, and 4, from the highest to the lowest.

In the example of FIG. 5, 4 new connections are established using the predetermined order O={1, 3, 2, 4}. When the cloud controller 550 receives a first connection request to establish a connection, the cloud controller 550 first determines that the input chassis 502 and the output chassis

524 can provide the requested connection. The cloud controller 550 then loads the predetermined order O, and start examining the capacity of the first interconnect chassis specified by the order O, i.e. interconnect chassis 1. In the example of FIG. 5, the cloud controller 550 determines, for example, by inquiry of the controller 1C or stored status of the interconnect chassis 1, that interconnect chassis 1 still has capacity to route the wavelength from the input chassis 502 to the output chassis 524, the cloud controller 550 sends instructions to controllers 1C, 502C, and 524C to establish the first connection. The controllers 1C, 502C, and 524C accordingly establish the first connection between input chassis 502 and the output chassis 524 via the interconnect chassis 1.

When the cloud controller 550 receives a second connection request to establish a connection, the cloud controller 550 determines that the input chassis 504 and the output chassis 522 can provide the requested connection. The cloud controller 550 then loads the predetermined order O, and examines the first interconnect chassis specified by the order O, namely interconnect chassis 1. The cloud controller 550 examines the capacity of interconnect chassis 1 to route the second connection. The cloud controller 550 determines that interconnect chassis 1 still has capacity to route the wavelength from the input chassis 504 to the output chassis 522, thus the cloud controller 550 sends instructions to controllers 1C, 504C, and 522C to establish the second connection. The controllers 1C, 504C, and 522C accordingly establish the second connection between input chassis 504 and the output chassis 522 via the interconnect chassis 1.

When the cloud controller 550 receives a third wavelength connection request to establish a connection, the cloud controller 550 determines that the input chassis 506 and the output chassis 526 can provide the requested connection. The cloud controller 550 then loads the predetermined order O, and examines the first interconnect chassis specified by the order O, which is interconnect chassis 1. The cloud controller 550 examines the capacity of interconnect chassis 1 to route the third connection. If the cloud controller 550 determines that interconnect chassis 1 still has the same wavelength capacity to route the wavelength from the input chassis 506 to the output chassis 526, the cloud controller 550 sends instructions to controllers 1C, 506C, and 526C to establish the third connection. The controllers 1C, 506C, and 526C accordingly establish the third connection between input chassis 506 and the output chassis 526 via the interconnect chassis 1.

When the cloud controller 550 receives a fourth connection request to establish a connection, the cloud controller 550 determines that the input chassis 508 and the output chassis 528 can provide the requested connection. The cloud controller 550 then loads the predetermined order O, and examines the first interconnect chassis specified by the order O, again the interconnect chassis 1. The cloud controller 550 examines the capacity of interconnect chassis 1 to route the second connection. The cloud controller 550 determines that interconnect chassis 1 still has capacity to route the wavelength from the input chassis 508 to the output chassis 528, the cloud controller 550 sends instructions to controllers 1C, 508C, and 528C to establish the second connection. The controllers 1C, 508C, and 528C accordingly establish the second connection between input chassis 508 and the output chassis 528 via the interconnect chassis 1.

As described in the example of FIG. 5, as defined in the order O, in each time when a connection is to be established, the interconnect chassis 1 is always first considered for establishing a new connection. As such, the interconnect chassis 1 generally has the highest utilization rate among other interconnect chassis.

Therefore, connections within one node or a cluster node in process 400 may involve a plurality of WSS 108. As discussed in FIGS. 1A and 2 above, a node may include multiple line cards 104 or add-drop tributary cards 106. Each of the line cards 104 and the add-drop tributary cards 106 may connect to the common backplane 150 via an Optical Connection (O-connection). Each line card 104 may comprise two 1×32 wavelength select switches (WSS) 108, one on the receiving side 114 and another on the transmitting side 116.

Therefore, the process 400 may establish a connection from an input link of a chassis or node to an output link of the chassis, which includes a plurality of connection establishments. In process 400, a wavelength connection from a direction k to the same wavelength connection to a direction m may include a plurality of connections in each of the input chassis, output chassis, and the interconnect chassis 306.

For example, the connection may involve a first same wavelength connection in the input chassis from an input WSS to an output WSS through the common backplane 150, a second same wavelength connection from the output WSS of the input chassis (node) to an input WSS of the interconnect chassis 306 through a fiber connectivity between the two chassis, a third same wavelength connection from the input WSS of interconnect chassis 306 to an output WSS of the interconnect chassis 306 through the common backplane 150, a fourth same wavelength connection from the output WSS of the interconnect chassis 306 to an input WSS of an output chassis through a fiber connectivity between the two chassis, a fifth same wavelength connection in the output chassis from the input WSS to an output WSS through the common backplane 150. Therefore, in this example, a connection from the input chassis to the out chassis via the interconnect chassis 306 involves 5 connections through 6 WSS that are interconnected by either backplane or optical fiber.

With the process 400, the performance of ROADM cluster nodes 300 and 500 can be conveniently managed. The specific order, such as O1 of ROADM cluster node 300 and O of ROADM cluster node 500 described above, may be set based on various objectives of carriers. For example, the order O or O1 may be determined and updated dynamically based on various criteria, such as network equipment failure, network equipment protection, network equipment utilization, and other network considerations including ease of network operation, ease of network maintenance, and software upgrade. In the example of O1, interconnect chassis M−1, which is listed at the bottom of the predetermined order O1, is least utilized. As a result, the interconnect chassis M−1 can be used as equipment protection if any one of other M−2 chassis 306 fails. In another example, the process 400 may be used in scheduled maintenance and software upgrade of any one of the M interconnect chassis

306, by declining any new connection and releasing existing wavelength connections to other interconnect chassis 306.

The specific order may also be set based on the network management strategy of the head office of the carriers. For example, certain interconnect nodes to be phased out will have a lower order, and newly added node may have a higher order. The interconnect nodes with a hardware failure may be assigned with a lower order.

In some examples, the specific order of the interconnect nodes 306 may be static and remains unchanged for a period of time. In some examples, the order of the interconnect nodes 306 may be adjusted dynamically, for example by a network administrator, based on real time utilization of the interconnect nodes 306 or load changes of the interconnect node 306.

In some examples, when a new interconnect node 306 is added into the RAODM cluster node 300, the order list may be updated to add the new interconnect node 306.

In some examples, an interconnect node 306 running at or close to its full capacity may be removed from the order list, so that the interconnect node 306 is not considered to establish a connection in the future. This saves time and resources to avoid attempts to connect to the interconnect node 306.

The process 400 significantly improves connection blocking rate in ROADM cluster node 300. A connection from an available input wavelength to an available output wavelength is blocked if none of the interconnect nodes can establish a wavelength connection. The performance of the process 400 may be compared with random routing (RR) and load balancing (LB) mechanisms. In random routing, the connection manager attempts to establish the connection from a randomly selected interconnect node. If the connection is blocked, then the connection manager uses another randomly selected interconnect node till it exercises all the interconnect nodes. In load-balancing (LB), the connection manager attempts to establish the connection from an interconnect node that has the least number of connections, for instance, using the sum of the connectivity of all the wavelengths as a measuring metric. If the connection is blocked, then the connection manager moves to the second best and so on.

The process 400, in one embodiment, attempts to maximize the utilization of the interconnect nodes with the specified order. The load balancing attempts to balance the connections across all the interconnect chassis. The random routing randomly selects the interconnect chassis and similar to load-balancing, the connections tend to have the same utilization rate.

Average blocking rate for the process 400 and random routing analytical results is derived in the examples below. In the examples in Table 3 below, case 5 is used to simplify the analytical modeling based on two factors. First, it has no add/drop rate; second, it represents the worst performance among cases 1 to 5. The analytical modeling assumes that each connection is a single wavelength connection occupying 50 GHz grid without considering super-channel.

Blocking is defined as the probability of an available wavelength k from an input link (line or add) to an available wavelength k of the output link (line or drop) is blocked, due to unavailability of wavelength k on any of the M interconnect nodes. The architeture of case 5 has a total wavelength connections of 17,920 (224 links×80 wavelengths). Any of M interconnect node, such as WSS16×16, can be used to connect input wavelength k to output wavelength k. From the wavelength perspective, the architecture in case 5 has 80 logical wavelength planes, each plane with a 3-stage CLOS.

As described above, the order-based process 400 in one embodiment attempts the most used interconnect node first and the least used node last. The process 400 may be characterized by a utilization degree u indicating the number of nodes, or full links from input node to interconnect node that are occupied with connections. As such, new connections use interconnect nodes from u+1 to M. Assuming that each wavelength carry traffic with probability $\rho$, the blocking probability p for the link between first stage, second stage, and the second to the third stage) is given by:

- $p = 1$        for inter-stage links 1 to $u$

- $p = (N\rho - u)/(M - u)$   for inter-stage links from $u + 1$ to $M$

Probability that the first link from the input node to interconnect node or WSS is idle is (1−p), the same for the link between interconnect node and the output node. Probability that both links are idle is (1−p) (1−p)

Probability that the link is blocked is 1−(1−p) (1−p)

Probability that all the remaining links are blocked: (1−(1−p) (1−p))^(M−u)

The total blocking probability with substituting p is:

$$P_{pack} = \left[1 - \left(1 - \frac{N\rho - u}{M - u}\right)^2\right]^{M-u} \text{ for } u = 0, \ldots, N\rho$$

Note that for each wavelength ω, the architecture in case 5 can be viewed as a single plane with M interconnect switches. For wavelength ω, the packing degree $u_\omega$ is integer as the number of ports available in ω plane is integer. In order to assess a system with all 80 wavelengths (planes), average of packing degree across all wavelengths is assumed to be $$u = \frac{1}{80} \sum_{\omega=1}^{80} u_\omega,$$

which can be a double with fractional value.

As the maximum utilization degree is Np, with p=1 for 100% load, the maximum utilization is N=14. In one simulation run, the utilization of the first 14 interconnect nodes, the total wavelength utilized is 16,709, which is 93.25% of total wavelengths of 224×80=17,920. Therefore, the correct value of u to start with is u=0.9325*14=13.05.

From analytical modeling perspective, the architecture of case 5 includes 80 CLOS architectures, one for each wavelength. As a result the average utilization degree (for all wavelengths) is considered to be between 13 and 14.

Figure 7A:
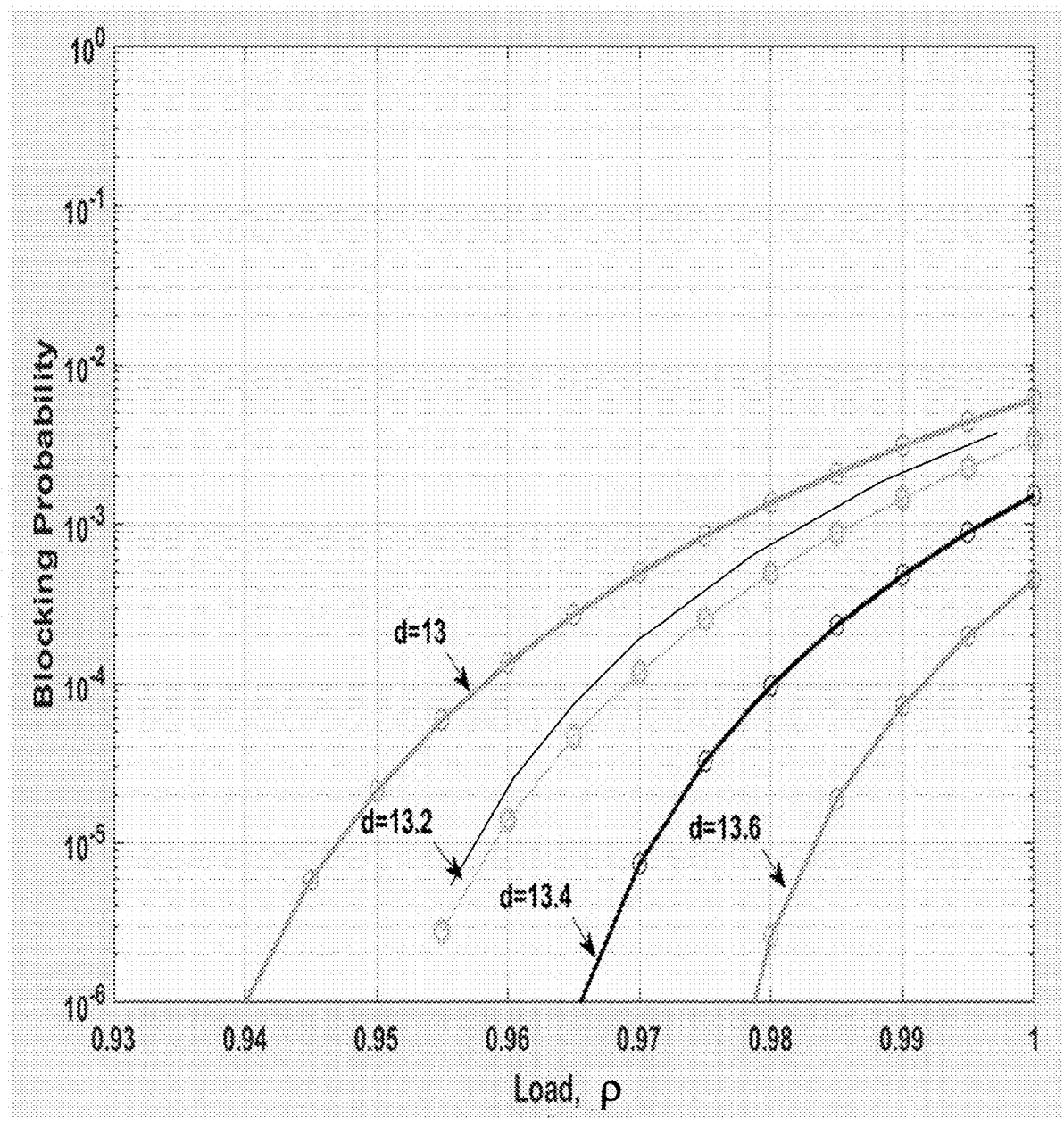
FIG. 7A illustrates blocking probability performance of the connection management process in FIG. 4, according to an embodiment of the present invention.

Using values of u, the blocking probability can be plotted as shown in FIG. 7A. FIG. 7A illustrates blocking probability when u=d=13, 13.2, 13.4, 13.6. As the loading p increases, the u value increases, and the blocking probability also increases. Observation from simulation results of the summary Table 3 shows that case 5 slightly impacts the mean blocking, likely because the add/drop rate has impacted the utilization degree as the connectivity profile in the interconnect node become random and uniform across all links.

The average blocking rate of the process 400 for one complete run in case 5 may be calculated as follows:

$$P_{pack}^{u_k} = \frac{1}{17920} \sum_{i=0}^{17920} P_{pack}(i) \quad \rho_i = 0, \frac{1}{17,920}, \dots, 1$$

For $u_1 = 13$, $\quad\quad P_{pack}^{u_1} = 7.8195 \times 10^{-5}$

For $u_2 = 13.2$, $\quad\quad P_{pack}^{u_2} = 3.5590 \times 10^{-5}$

For $u_3 = 13.4$, $\quad\quad P_{pack}^{u_3} = 1.2231 \times 10^{-5}$

For $u_4 = 13.6$, $\quad\quad P_{pack}^{u_4} = 0.2475 \times 10^{-5}$

Simulation results for approximately u=13.03 for various add/drop situation had resulted in $0.35 \times 10^{-5}$ to $1.82 \times 10^{-5}$ which validate each other.

The Random Routing and Load Balancing are almost identical as both offers similar interconnect utilization.

For Random Routing, probability the first link from the input node to interconnect node is idle is (1-p), where p is Me, and (1-p) for the link between interconnect and the output node. Probability that both links are idle is (1-p) (1-p). The Probability that the link is blocked is 1-(1-p) (1-p). The Probability that all the remaining links are blocked is: (1-(1-p) (1-p))^M. The total blocking probability $P_B$ with substituting p is:

$$P_B = \left[ 1 - \left( 1 - \frac{N\rho}{M} \right)^2 \right]^M \text{ for } 0 \le \rho \le 1$$

For one run varying load p, average blocking probability is obtained as $$P_B^{avg} = \sum_{i=0}^{17920} P_B(i)$$

Where $$\rho_i = 0, \frac{1}{17,920}, \dots, 1.$$

. . . , 1.

Figure 7B:
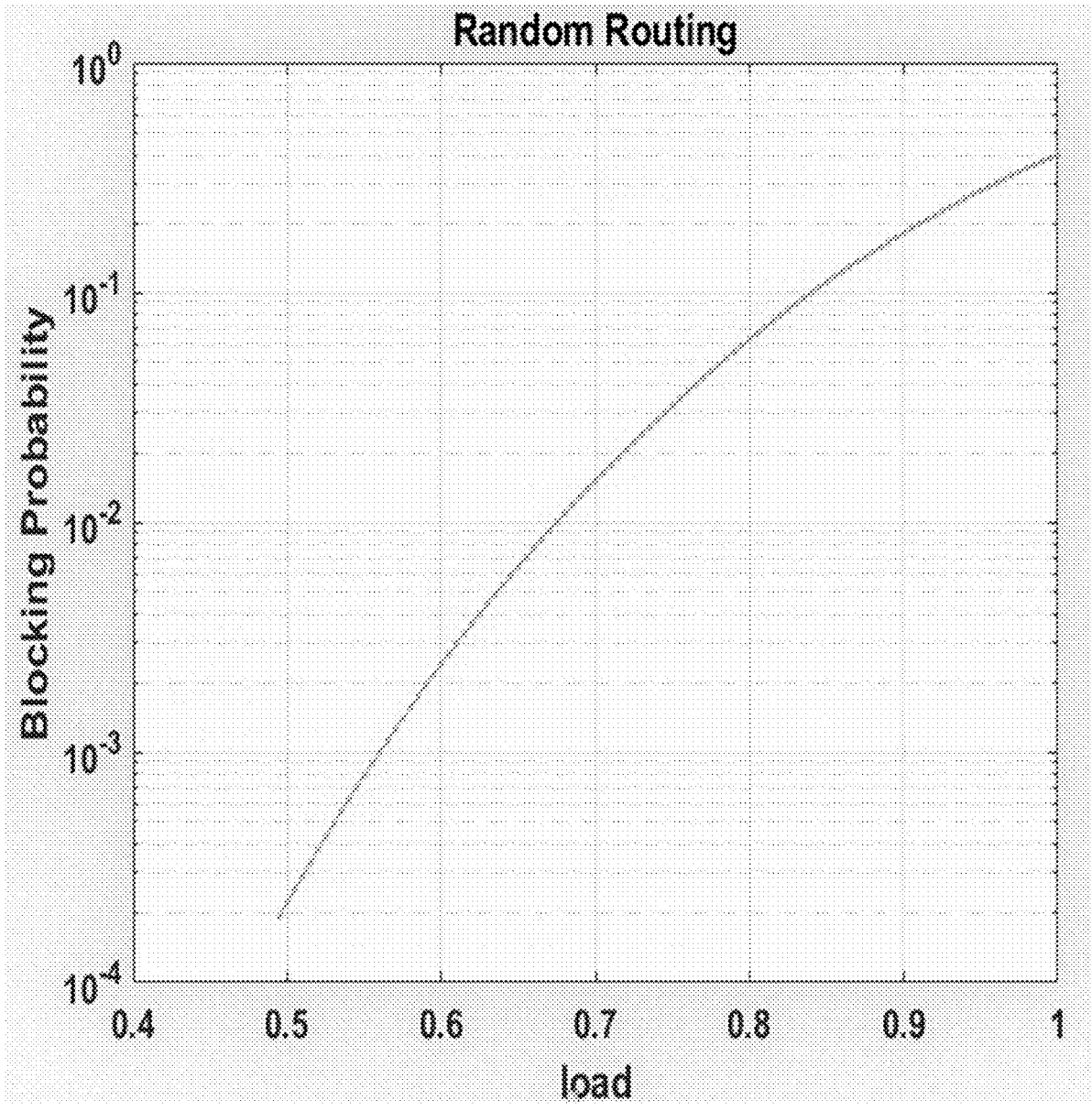
FIG. 7B illustrates blocking probability performance of random routing.

FIG. 7B illustrates blocking probability in view of the changes of load in random routing. In FIG. 7B, as the load increases, the blocking probability also increases. The average blocking rate of the random routing analytical result is $$P_B^{avg} = 0.044.$$

The Table 3 below is a summary of mathematical and simulation modelling performance of the ROADM cluster node 300 architecture establishing a connection using processing 400, load balancing, and random routing in five deployment scenarios:

| | Case 1 | Case 2 | Case 3 | Case 4 | Case 5 |
|---|---|---|---|---|---|
| Number of Line chassis (g) | 8 | 10 | 12 | 14 | 16 |
| Number of Add-Drop Chassis (h) | 8 | 6 | 4 | 2 | 0 |
| Number of Degree | 112 | 140 | 168 | 196 | 224 |
| Add/Drop rate | 100% | 60% | 33% | 14% | 0% |
| Total Channels (each degree comprising 80 channels or wavelength) | 17920 | 17920 | 17920 | 17920 | 17920 |
| Total Channels Added | 8960 | 6720 | 4480 | 2240 | 0 |
| Total Channels Dropped | 8960 | 6720 | 4480 | 2240 | 0 |
| Pass-through Channels | 0 | 4480 | 8960 | 13440 | 17920 |
| Mean Blocking for simulating Load Balancing Algorithm | 0.0104 | 0.0103 | 0.0102 | 0.0104 | 0.0116 |
| Mean Blocking for simulating Random Routing | 0.0079 | 0.079 | 0.08 | 0.0084 | 0.009 |
| Mean Blocking for simulating Order based process 400 | $3.5 \times 10^{-5}$ | $4.7 \times 10^{-6}$ | $7.2 \times 10^{-6}$ | $1.3 \times 10^{-5}$ | $1.8 \times 10^{-5}$ |
| Average Blocking Rate for Random Routing Analytical Results | 0.044 (inherently assumes Case 5) | | | | |
| Average Blocking Rate for Order based process 400 from Analytical Results | $3.5 \times 10^{-5}$ to $1.8195 \times 10^{-5}$ | | | | |

Referring to Table 3 above, Case 1 features a ROADM cluster node with 112 degree (112 fibers in and 112 fiber out with 80 wavelengths per fiber) in which all wavelength connections are dropped (terminated) at this node and new connections are sourced from this node. Case 5, on the other hand has no connection terminated nor added as all wavelengths are switched to other fibers in other directions. Both Case 1 and Case 5 offer corner cases for performance analysis, and may not be deployed. Cases 2-4 with an add/drop rate of 60%-14% are more likely to be deployed. Each of cases 1-5 may include a mix of supper-channel and single channel. For example, the super-channel may be 0%-100% of the total channel number.

In the Table 3 above, even numbers are used for different combination of g and h. g and h may be also odd numbers, so long as satisfying the relationship g+h=S, wherein S for the low-cost common equipment is 16.

As shown in Table 3, the process 400 significantly reduces blocking rate, which is within an acceptable range without re-arranging the existing connections. The wavelength connections cannot be re-arranged in order to accommodate a new connection as re-arrangements result in traffic and connectivity loss. In the ROADM cluster node 300, additional capacity may be added by including additional line chassis 302, add-drop chassis 304 and interconnect chassis 306, without re-arranging the existing connection, architecture or algorithm of the ROADM cluster node 300. In Table 3, with the process 400, the mean blocking rate in each of cases 1 to 5, either for single channel or for super-channel, is about $10^{-5}$, which is better than the acceptable range $10^{-3}$. In comparison, the average blocking rate for random routing is about 0.044 and the average blocking rate for load balancing is about 0.01.

Figure 7C:
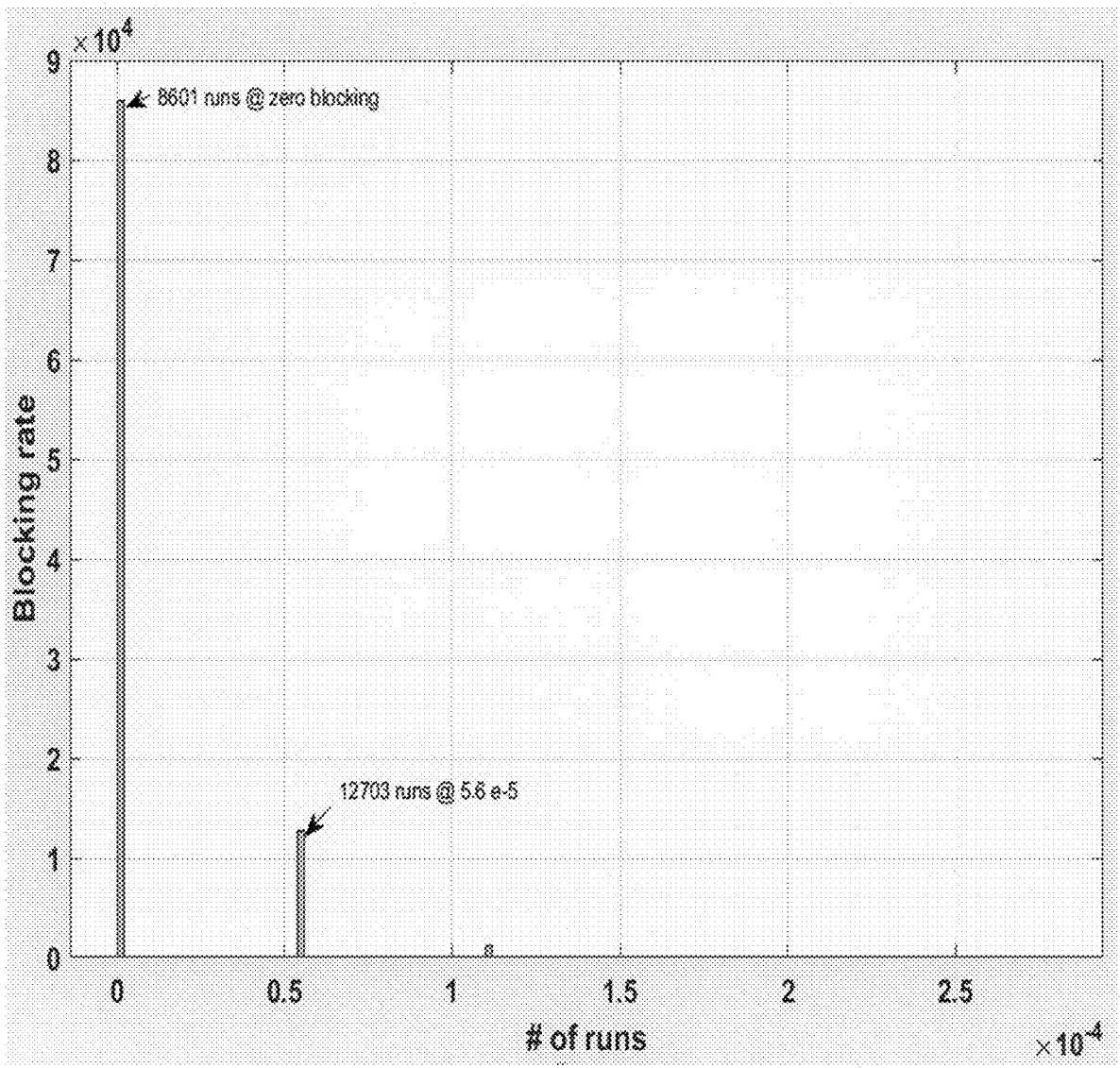
FIG. 7C illustrates blocking probability of 100,000 simulation runs for the connection management process in FIG. 4, according to an embodiment of the present invention.
Figure 7D:
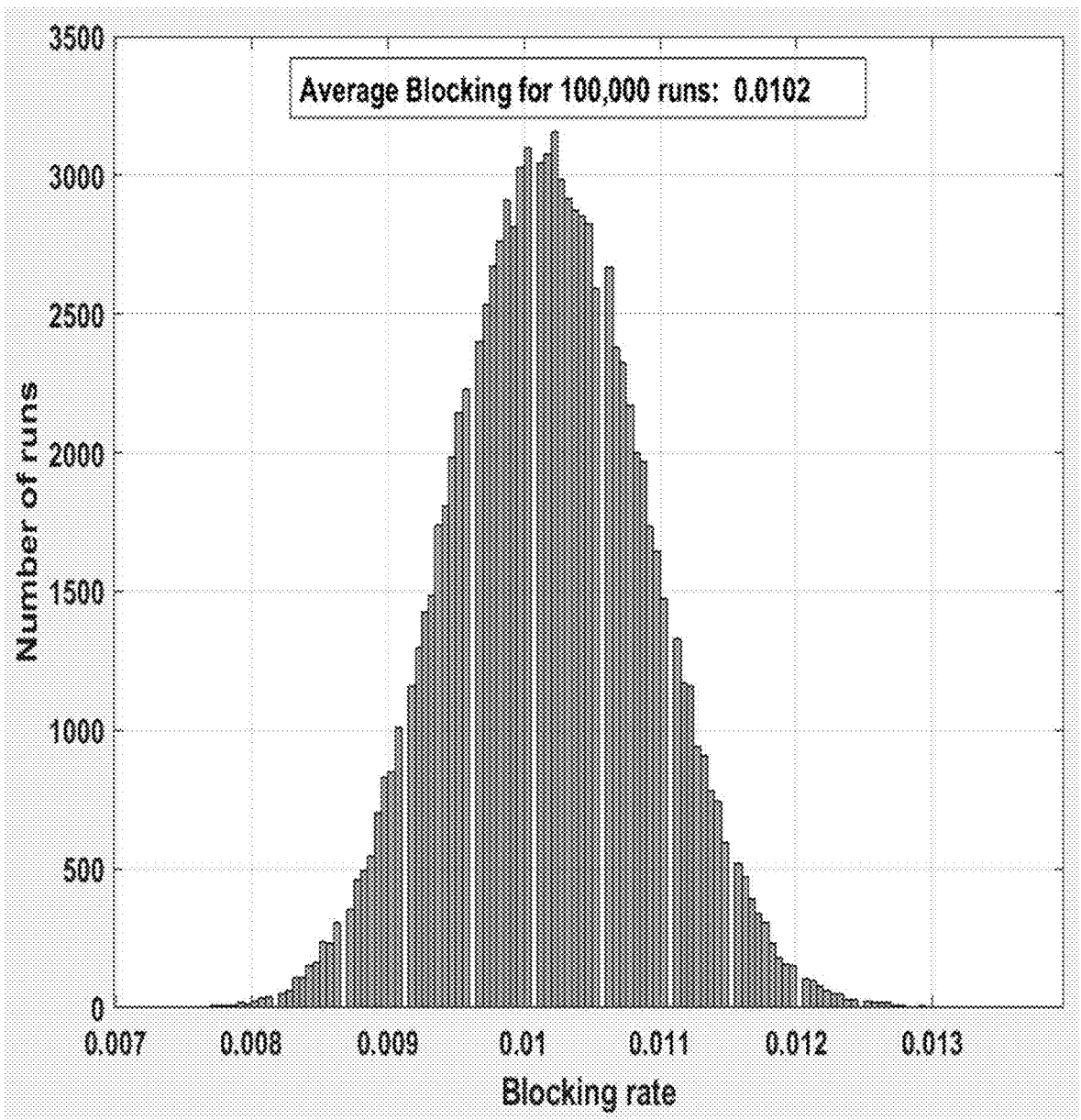
FIG. 7D illustrates blocking probability of 100,000 simulation runs for Load-balancing and random routing.
Figure 7E:
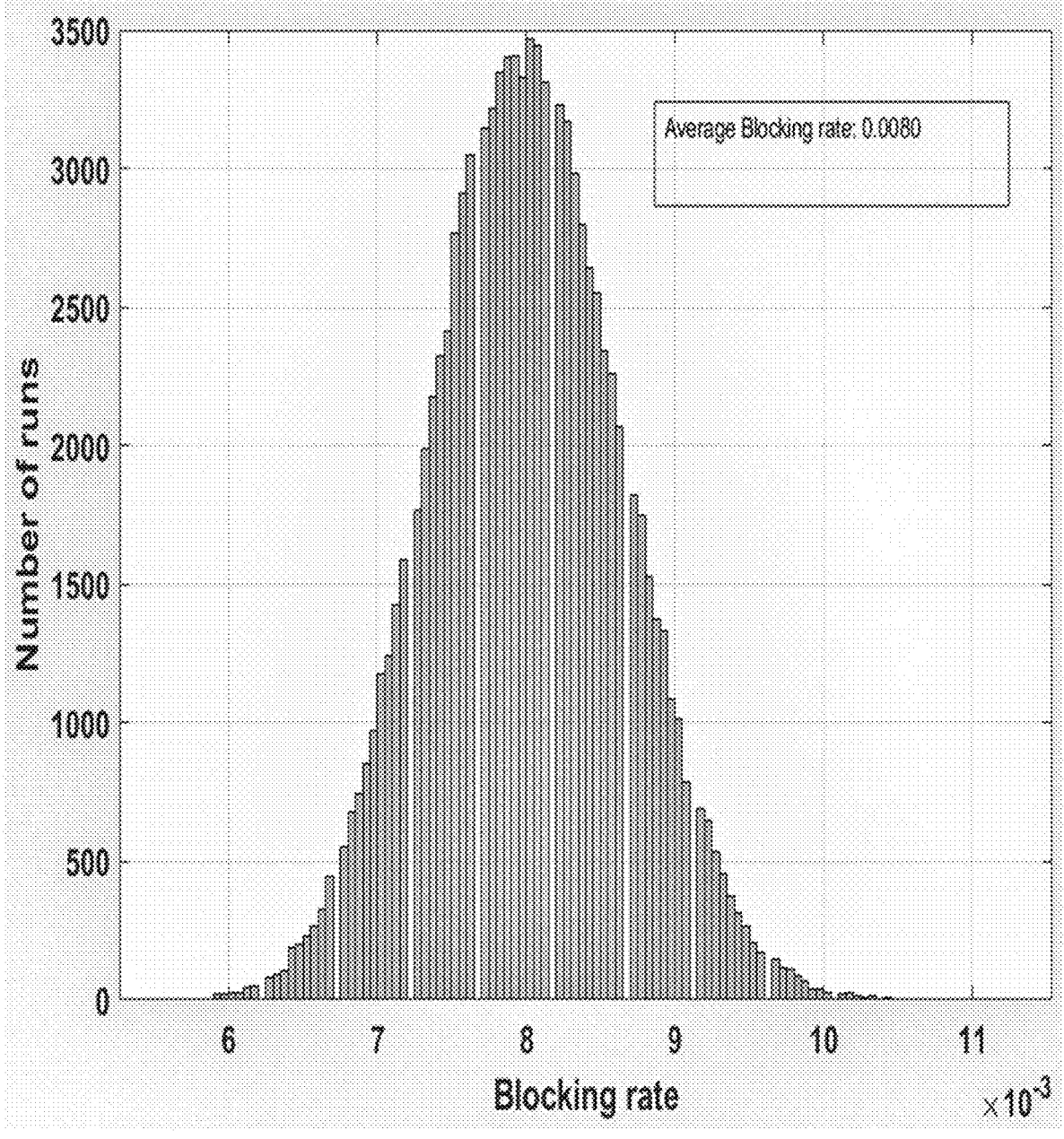
FIG. 7E illustrates blocking probability of 100,000 simulation runs for random routing.

In single-channel connections, the blocking rate in process 400 is better than random routing and load balancing. FIG. 7C shows a histogram of blocking probability of 100,000 simulation runs in case 3 in table 3 above using the process 400. The average blocking rate for 100,000 runs using process 400 is about $7.2 \times 10^{-6}$. FIG. 7D shows a histogram of blocking probability of 100,000 simulation runs in case 3 using load-balancing algorithm. The average blocking rate for 100,000 runs using load-balancing algorithm is about 0.0102. FIG. 7D shows a histogram of blocking probability of 100,000 simulation runs in case 3 using random routing. The average blocking rate for 100,000 runs using random routing algorithm is about 0.0080.

As well, the process 400 is about 4 times fasters than random routing, and about 9 times faster than the load balancing. The process 400 is faster as it does not need to generate random number in random routing process 400 does not need to calculate load of the interconnect nodes and balancing in load balancing.

Although the process 400 is described in the example of the ROADM cluster nodes 300 and 500 for wavelength connectivity, the process 400 can also apply to other multi-stage communications network with both wavelength and/or digital connections. In some examples, a multi-stage communications network can include a photonic layer network and a digital layer (layer-1) network. A ROADM cluster node with wavelength switches is one example in which process 400 can be applied. Other examples may include an optical network, e.g., with a 3-stage CLOS network or any other configuration, to form a digital cluster node for Time Division Multiplexing (TDM) or Optical Transport Network (OTN) connectivity among switches or nodes. In some examples, the multi-stage communications network also includes wireless transmission networks, such as microwave networks.

Figure 6:
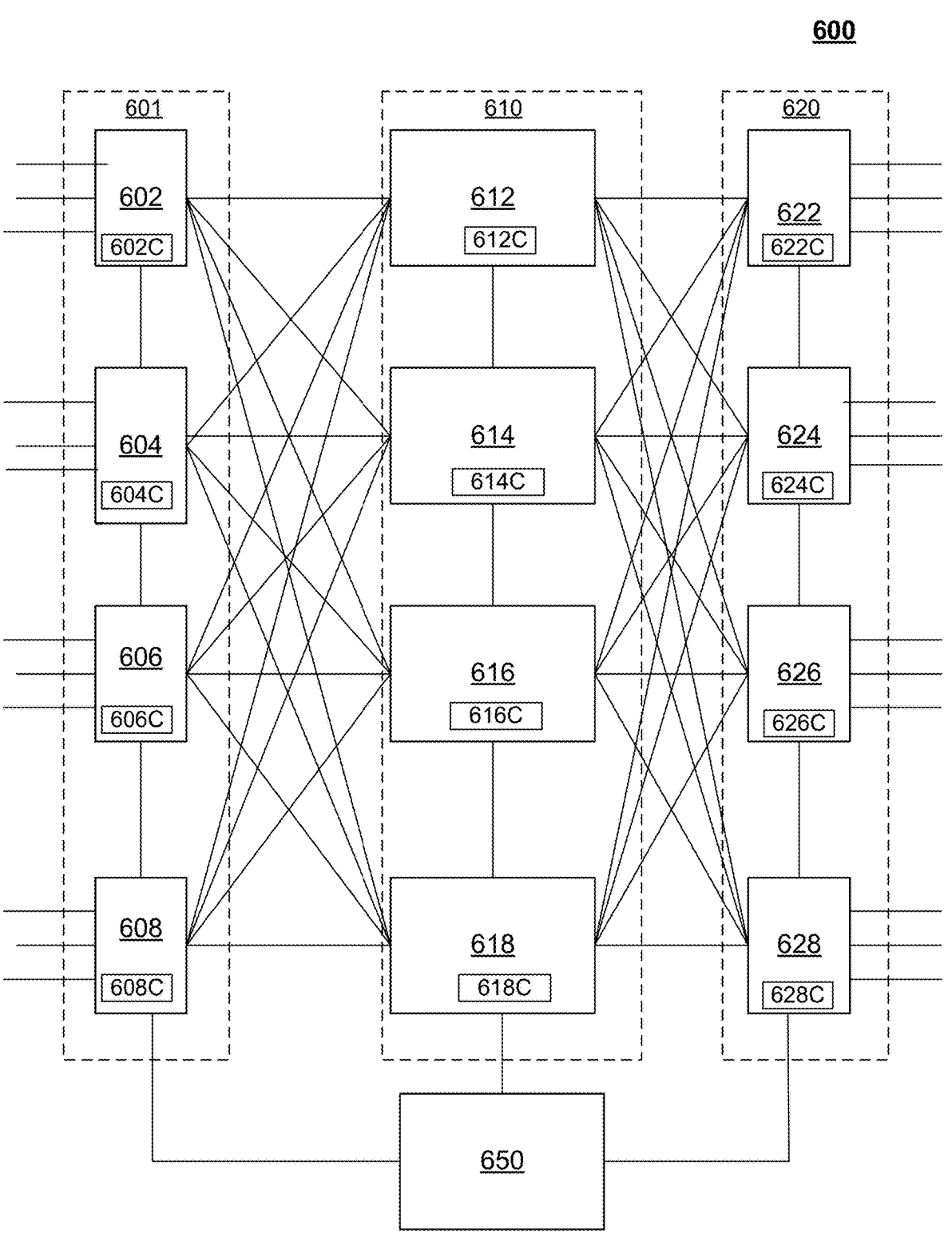
FIG. 6 illustrates a multi-stage communications network, according to an embodiment of the present invention.

As illustrated in the example of FIG. 6, a multi-stage communications network 600 includes a plurality of input nodes 601, such as nodes 602, 604, 606 and 608, a plurality of output nodes 620, such as nodes 622, 624, 626, and 628, a plurality of interconnect nodes 610, such as 612, 614, 616, and 618, and a controller 650. The input nodes 601 receives transmissions in one or more wavelengths or communication channels, for examples from one or more remote transmission nodes. The output nodes 620 transmits the transmissions in the one or more wavelengths or communication channels from the interconnect nodes 610 to desired destinations. Each interconnect node 610 may interconnect any one of the input nodes 601 and the output nodes 620 to establish connections.

Each input node 601 has a controller, such as 602C at input node 602, 604C at input node 604, 606C at input node 606, and 608C at input node 608. Each interconnect node 610 has a controller, such as 612C at the interconnect node 612, 614C at the interconnect node 614, 616C at the interconnect node 616, and 618C at the interconnect node 618. Each output node 620 has a controller, such as 622C at the output node 622, 624C at the output node 624, 626C at the output node 626, and 628C at the output node 628. The controller 650 is configured to communicate with the controllers of the input nodes 601, interconnect nodes 610 and the output nodes 620, for example, via communication cable or fiber. The controller 650 may transmit instructions to controllers of relevant nodes, and the controllers of relevant nodes may cause respective nodes to establish or release one or more connections in accordance with the instructions.

In accordance with a specific order set by a network administrator, the controller 650 may select appropriate interconnect nodes 610 to connect input nodes 601 with output nodes 620 and to relay the transmissions in one or more wavelengths or communication channels, in accordance with the process 400 described above. The input nodes 601 correspond to input chassis in process 400, the output nodes 620 correspond to the output chassis in process 400; the interconnect nodes 610 correspond to the interconnect chassis in process 400; and the controller 650 correspond to the cloud controller 308 or the controller 550 in process 400.

In some examples, the multistage network is a TDM/OTN switch or node. A pool of add/drop cards of the TDM/OTN switch or node may be shared. The process 400 allows to achieve higher add/drop rate and better connection grooming. For example, in an OTN cluster node, line chassis 202 and interconnect chassis 206 can provide higher bandwidth connections, such as 100G OTU4, and the add/drop chassis 204 can provide lower bandwidth connections, such as 40G OTU3, or 10G OTU2. Each add/drop chassis 204 has aN interconnect card at OTU4 that connects to an interconnect node 206. The chassis backplane 150 connectivity can be digital or optical. As such, the add/drop chassis 204 can perform both as an add or drop of a 100G and aggregation of lower OTU signals, such as OTU3 or OTU2 signals, to one OTU4 signal. Alternatively, the add/drop chassis 204 can dis-aggregate of a higher OTU4 signals to lower OTU signals, such as OTU3 or OTU2 signals.

Figure 8:
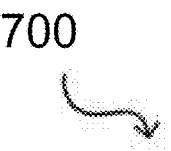
FIG. 8 is a block diagram of a controller of a communications network, according to an embodiment of the present disclosure.

FIG. 8 is a block diagram of a controller 700 that may be used in perform the process 400. For example, the controller 700 may be the cloud controller 308, 550 528 or 650, line chassis controller 313 or 315, add/drop chassis controller 317 or 319, interconnect chassis controller 321, 323, or 325 in FIG. 3. The controller 700 may also be the cloud controller 550, the input node controller 502C, 504C, 506C or 508C, the output node controller 522C, 524C, 526C or 528C, and the interconnect node controller 1C, 2C, 3C, or 4C in FIG. 5. The controller 700 may also be the cloud controller 650, the input node controller 602C, 604C, 606C or 608C, the output node controller 622C, 624C, 626C or 628C, and the interconnect node controller 612C, 614C, 616C, or 618C in FIG. 6.

As illustrated in FIG. 8, the controller 700 includes a processor 710, memory 720, non-transitory mass storage 730, I/O interface 740, network interface 750, and a trans-ceiver 760, all of which are communicatively coupled via bi-directional bus 770. The controller 700 may contain multiple instances of certain elements, such as multiple processors, memories, or transceivers.

The processor 710 may be a Central Processing Unit (CPU) or specialized processors such as a Graphics Pro-cessing Unit (GPU), a microprocessor, an application-spe-cific integrated circuit (ASIC), a field-programmable gate array (FPGA), a dedicated logic circuitry, or combinations thereof.

The memory 720 may include a volatile or non-volatile memory e.g., a flash memory, a random-access memory (RAM), and/or a read-only memory (ROM). The non-transitory memory 720 may store instructions for execution by the processor 710, such as to carry out methods or processes described in the example of the present disclosure. The memory 720 may include other software instructions, such as for implementing an operating system and other applications/functions.

In some other examples, memory 720 may be provided by a transitory or non-transitory computer-readable medium. Examples of non-transitory computer readable media include static random-access memory (SRAM), dynamic random access memory (DRAM), synchronous DRAM (SDRAM), read-only memory (ROM), random access memory (RAM), an erasable programmable ROM (EPROM), an electrically erasable programmable ROM (EEPROM), a flash memory, a CD-ROM, or other portable memory storage.

The mass storage element 730 may include any type of non-transitory storage device, such as a solid-state drive, hard disk drive, a magnetic disk drive, an optical disk drive, USB drive, or any computer program product configured to store data and machine executable program codes. The memory 720 or mass storage 730 may have recorded thereon statements and instructions executable by the processor 710 for performing any of the methods described above.

Through the descriptions of the preceding embodiments, the present disclosure may be implemented by using hard-ware only or by using software and a necessary universal hardware platform. Based on such understandings, the tech-nical solution of the present disclosure may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alterna-tive embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assem-blies could be modified to include additional or fewer of such elements/components. For example, although any of the elements/components disclosed may be referenced as being singular, the embodiments disclosed herein could be modified to include a plurality of such elements/compo-nents. The subject matter described herein intends to cover and embrace all suitable changes in technology.

Certain adaptations and modifications of the described embodiments can be made. Therefore, the above discussed embodiments are considered to be illustrative and not restrictive.

What is claimed is:

1. A method for establishing a connection in a commu-nications network, comprising:

receiving, by a processor, a connection request for estab-lishing the connection;

selecting, by the processor, an input node from a plurality of input nodes in the communications network and an output node from a plurality of output nodes in the communications network;

selecting, by the processor, an interconnect node from a plurality of interconnect nodes in the communications network in accordance with an order set out in a pre-determined order list that sets out a specific con-nection order for each of the plurality of interconnect nodes;

determining whether the interconnect node has capacity to connect the input node to the output node;

in response to the interconnect node having the capacity, connecting, by the processor, the input node to the output node via the interconnect node;

in response to the interconnect node having no capacity to connect the input node to the output node, determining, by the processor, whether all of the plurality of interconnect nodes on the pre-determined order list have been examined;

when all of interconnect nodes on the pre-determined order list have not been examined, selecting a next interconnect node having a second order next to the order of the interconnect node on the pre-determined order list;

determining whether the next interconnect node has capacity to connect the input node to the output node; and when the next interconnect node has the capacity to connect the input node to the output node, connecting, by the processor, the input node to the output node via the next interconnect node.

2. The method of claim 1, wherein the interconnect node has a first order on the pre-determined order list.

3. The method of claim 1, further comprising:

in response to all of the plurality of interconnect nodes on the pre-determined order list having been examined, blocking, by the processor, the connection request.

4. The method of claim 1, wherein the pre-determined order list is determined based on one or more criteria of network equipment failure, network equipment protection, network equipment utilization, ease of network operation, ease of network maintenance, and software upgrade.

5. The method of claim 1, further comprising:

dynamically updating, at the processor, orders of the plurality of interconnect nodes on the order list based on one or more criteria of network equipment failure, network equipment protection, network equipment utilization, and other network considerations including ease of network operation, ease of network maintenance, and software upgrade.

6. The method of claim 1, further comprising:

removing, at the processor, the interconnect node from the predetermined order list for network maintenance or software upgrade.

7. The method of claim 1, wherein the communications network is a multi-stage communications network comprising a photonic layer network, a digital layer network, an optical network with a 3-stage CLOS network for forming a Wavelength Division Multiplexing (WDM) node or a digital cluster node for Time Division Multiplexing (TDM) or Optical Transport Network (OTN) connectivity, a wireless transmission network, and a microwave networks.

8. The method of claim 1, wherein the communications network is a reconfigurable optical add-drop multiplexer (ROADM) cluster node, the input node and output node are each a line chassis or an add-drop chassis, and wherein the plurality of interconnect nodes each comprise a respective interconnect chassis, each line chassis comprising N fibers or degrees, and wherein N<M<1.3N and M is the number of interconnect chassis.

9. The method of claim 1, further comprising communicating, by the processor, one or more management messages to the input node, output node and the interconnect node.

10. The method of claim 1, wherein the connection is a first line chassis to a second line chassis connection, a third line chassis to a drop card of a first add-drop chassis connection, or an add card of a second add-drop chassis to a fourth line chassis connection.

11. The method of claim 1, wherein the connection is selected from a group consisting of: an optical wavelength connection; a single wavelength connection; and a super-channel comprising more than one single wavelength in a continuous spectrum.

12. The method of claim 1, wherein the connection comprises a first same wavelength connection in the input node from a first input wavelength select switch (WSS) to a first output WSS, a second same wavelength connection from the first output WSS of the input node to a second input WSS of the interconnect node, a third same wavelength connection from the second input WSS of interconnect node to a second output WSS of the interconnect node, a fourth same wavelength connection from the second output WSS of the interconnect node to a third input WSS of the output node, and a fifth same wavelength connectivity in the output node from the third input WSS to a third output WSS.

13. A communications network, comprising:

a plurality of input nodes;

a plurality of output nodes;

a plurality of interconnect nodes; and a controller configured to:

receive, by a processor, a connection request for establishing the connection;

select, by the processor, an input node from the plurality of input nodes in the communications network and an output node from the plurality of output nodes in the communications network;

select, by the processor, an interconnect node from the plurality of interconnect nodes in the communications network in accordance with an order set out in a pre-determined order list that sets out a specific order for each of the plurality of interconnect nodes;

determine whether the interconnect node has capacity to connect the input node to the output node;

in response to the interconnect node having the capacity, connect, by the processor, the input node to the output node via the interconnect node;

in response to the interconnect node having no capacity to connect the input node to the output node, determine whether all of the plurality of interconnect nodes on the pre-determined order list have been examined;

when all of interconnect nodes on the pre-determined order list have not been examined, select a next interconnect node having a second order next to the order of the interconnect node on the pre-determined order list;

determine whether the next interconnect node has capacity to connect the input node to the output node; and when the next interconnect node has the capacity to connect the input node to the output node, connect the input node to the output node via the next interconnect node.

14. The network of claim 13, wherein the interconnect node has a first order on the pre-determined order list.

15. The network of claim 13, the controller further configured to:

in response to all of the plurality of interconnect nodes on the pre-determined order list having been examined, block the connection request.

16. The network of claim 13, wherein the pre-determined order list is determined based on one or more criteria of network equipment failure, network equipment protection, network equipment utilization, ease of network operation, ease of network maintenance, and software upgrade.

17. The network of claim 13, the controller further configured to:

dynamically update, orders of the plurality of interconnect nodes on the order list based on one or more criteria of network equipment failure, network equipment protection, network equipment utilization, and other network considerations including ease of network operation, ease of network maintenance, and software upgrade.

18. The network of claim 13, wherein the network is a multi-stage communications network comprising a photonic layer network, a digital layer network, an optical network with a 3-stage CLOS network for forming a Wavelength Division Multiplexing (WDM) node or a digital cluster node for Time Division Multiplexing (TDM) or Optical Transport Network (OTN) connectivity, a wireless transmission network, and a microwave network.

\* \* \* \* \*